United States Patent [19]

Stahl et al.

[11] 4,305,820
[45] Dec. 15, 1981

[54] APPARATUS FOR THE TREATMENT OF A FILTER CAKE WITH A LIQUID ON A MOVABLE FILTER

[75] Inventors: Werner Stahl, Münich; Bernhard Richter, Puchheim; Franz Koch, Münich, all of Fed. Rep. of Germany

[73] Assignee: Krauss-Maffei Aktiengesellschaft, Münich, Fed. Rep. of Germany

[21] Appl. No.: 870,614

[22] Filed: Jan. 19, 1978

Related U.S. Application Data

[63] Continuation-in-part of Ser. No. 807,650, Jun. 17, 1977, abandoned.

[30] Foreign Application Priority Data

Jun. 18, 1976 [DE] Fed. Rep. of Germany ....... 2627266

[51] Int. Cl.³ .............................................. B01D 33/26
[52] U.S. Cl. .................................. 210/327; 210/331; 210/334
[58] Field of Search ............... 210/220, 327, 330, 331, 210/332, 334, 347

[56] References Cited

U.S. PATENT DOCUMENTS

| | | | |
|---|---|---|---|
| 1,259,139 | 3/1918 | Salisbury | 210/331 X |
| 2,406,065 | 8/1946 | Dickinson et al. | 210/331 X |
| 2,854,142 | 9/1958 | Baker | 210/332 |
| 3,240,338 | 3/1966 | Schmidt, Jr. et al. | 210/334 X |
| 3,478,885 | 11/1969 | Jackson | 210/327 X |
| 3,704,603 | 12/1972 | Richter | 210/327 X |
| 3,951,758 | 4/1976 | Porsch | 210/220 X |

FOREIGN PATENT DOCUMENTS

| | | | |
|---|---|---|---|
| 591659 | 2/1960 | Canada | 210/327 |
| 653137 | 11/1962 | Canada | 210/327 |
| 1275998 | 8/1968 | Fed. Rep. of Germany | 210/334 |

*Primary Examiner*—Robert H. Spitzer
*Attorney, Agent, or Firm*—Karl F. Ross

[57] ABSTRACT

A disk-filter apparatus in which a filter disk is rotatable about a horizontal axis and lies substantially in a vertical plane to collect filter cakes on opposite sides of the disk. The filter cakes are each treated with a liquid from an array of ducts parallel to the filter cake and from which the liquid is distributed onto the filter cake. The ducts of each array are supplied at least in part through overflow boxes or weirs to control the pressure. The number of openings, spacing of the ducts and opening size are all selected to obtain the most homogeneous distribution of liquid onto the filter cakes that is possible.

36 Claims, 19 Drawing Figures

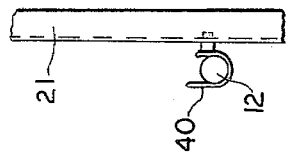
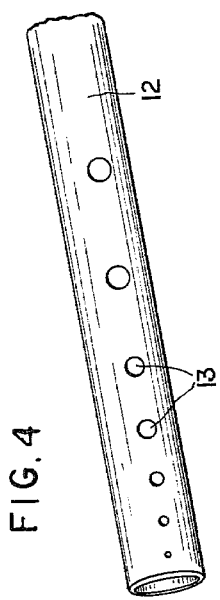
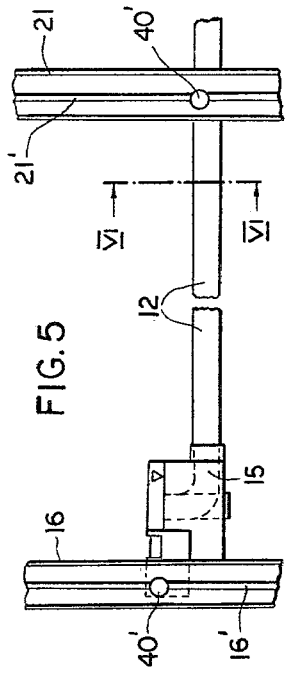
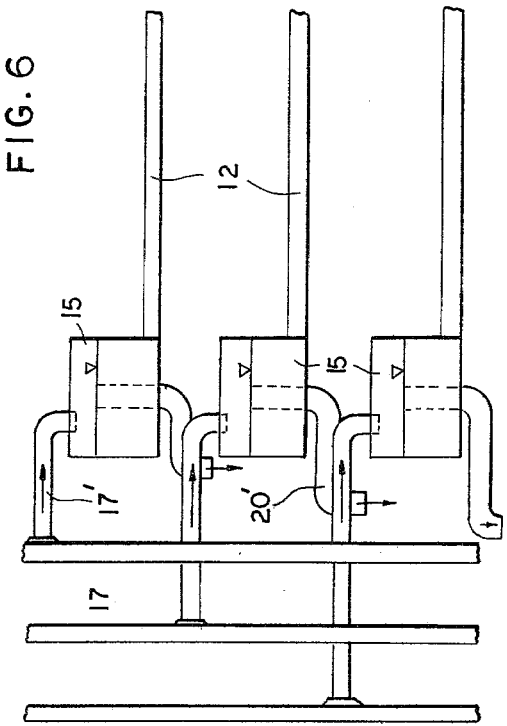
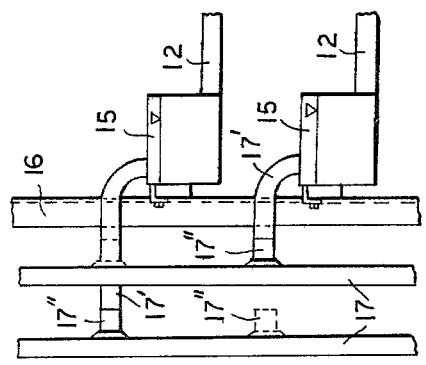
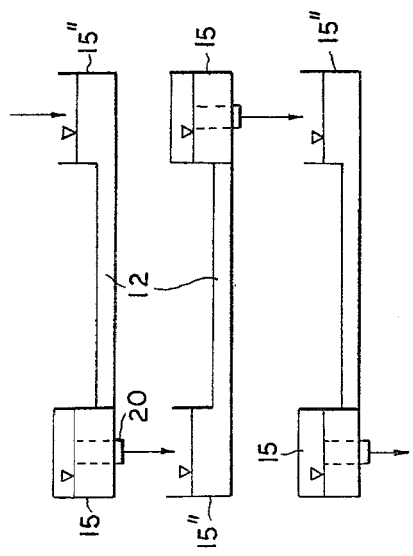

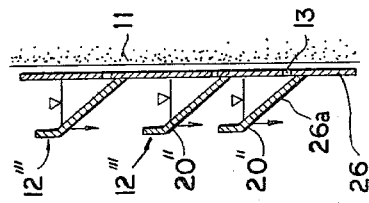
FIG. 16
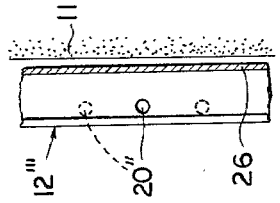
FIG. 17
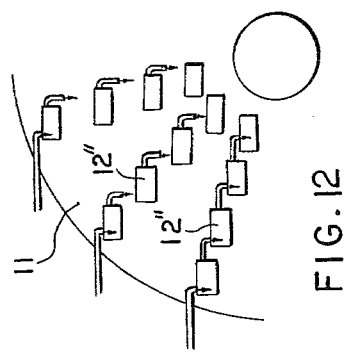
FIG. 12
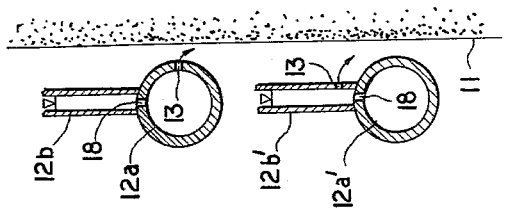
FIG. 18
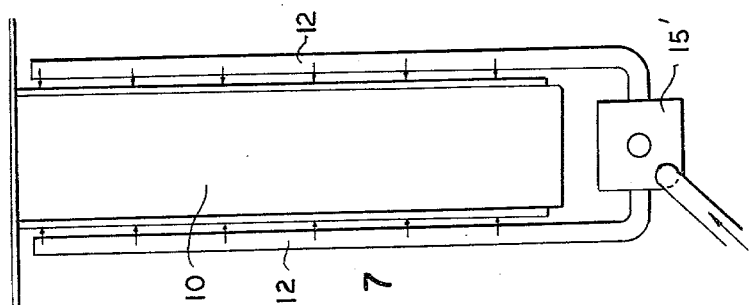
FIG. 7
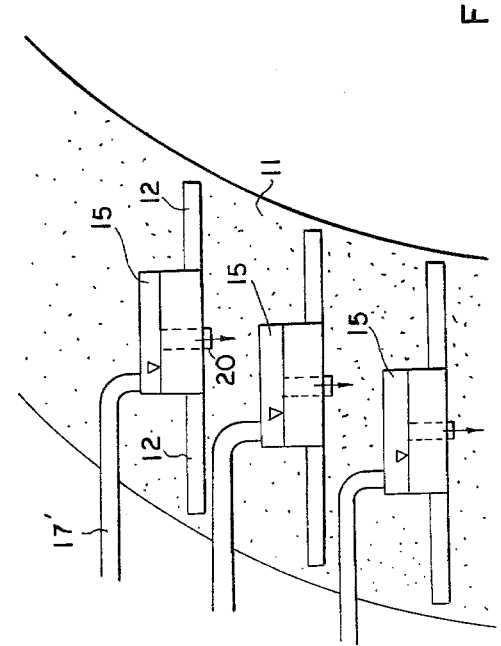
FIG. 11
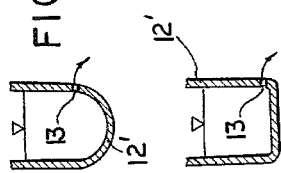
FIG. 14
FIG. 15
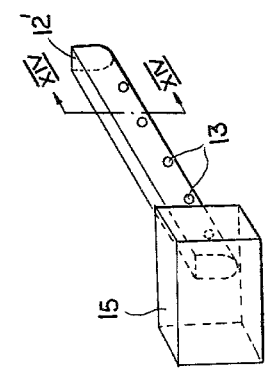
FIG. 13

APPARATUS FOR THE TREATMENT OF A FILTER CAKE WITH A LIQUID ON A MOVABLE FILTER

CROSS REFERENCE TO RELATED APPLICATION

This application is a continuation-in-part of our co-pending U.S. application Ser. No. 807,650, filed 17 June 1977, now abandoned.

FIELD OF THE INVENTION

The present invention relates to a device for the treatment of a filter cake on a movable filter surface with a fluid and, more particularly, for the washing of a filter cake on a movable disk-type filter surface whereby the treatment liquid is applied to the surface of a filter cake.

BACKGROUND OF THE INVENTION

It is known to collect a filter cake upon a filter drum and to treat this filter cake on the movable filter with a washing liquid. In the common filtering process of this type, the filter cake is washed with a washing liquid in a quantity, amount and composition such that the liquid traverses the filter cake and carries with it the soluble components. Consequently, the soluble components are washed through the filter cake and the filtering surface upon which the filter cake lies.

It is desirable to distribute the washing liquid uniformly over the entire surface of the filter cake so that the latter is washed as completely as possible and as uniformly as possible.

To this end it is generally known to distribute the washing liquid either by an overflow trough in the form of a fine water curtain upon the filter cake or to spray the filter cake with a liquid mist which is emitted from nozzles at relatively high pressure.

For many applications, the use of a disk filter is more desirable than the use of a drum filter. In a disk filter, the filtering surface is formed as a relatively thin disk which is rotated about an axis perpendicular to the filtering surface, the latter lying in a plane perpendicular, in turn, to the axis. Disk filters have been found to be particularly desirable when especially large filter surface areas are needed, for filters which are readily transported and wherever improved resolution is desired.

For example, disk filters, for a given filter surface area, require less space than a drum filter. However, disk filters have been found not to be practical for many applications, especially where an effective washing of the filter cake is desired. The difficulty is especially pronounced when the filter disks are disposed in vertical planes.

In disk filters having vertically oriented filter surfaces, there is always the danger, upon washing of the filter cake with a liquid, that the filter cake will fall off the filter surface. As a result, the use of a disk filter has generally been excluded whenever an intensive washing of the filter cake is necessary or desirable.

OBJECT OF THE INVENTION

It is the principal object of the present invention to provide an apparatus for the liquid treatment of a filter cake upon a disk filter which permits an intensive washing of the filter cake without the danger that the filter cake will be lost from the surface of the filter disk.

SUMMARY OF THE INVENTION

This object and others which will become more readily apparent hereinafter are attained, in accordance with the present invention, in a disk filter and, more particularly, a filter provided with at least one vertically oriented rotatable filter disk, which is formed with a plurality of pipes or tubes (ducts) in mutually parallel but transversely spaced relationship, the pipes extending parallel to chords of the disk or along secants thereof in juxtaposition with a free surface of the filter cake and having perforations or orifices from which the liquid is distributed onto the filter surface.

More particularly, the pipes are disposed in a planar array parallel to but spaced from the surface of the filter cake to be treated in a vertical plane, the pipes having a predetermined spacing from one another and a predetermined spacing from the surface of the filter cake with which they are juxtaposed and having discharge orifices in a number and spacing such that the liquid distributed from all of these openings is uniformly distributed over the entire surface of the filter cake.

In accordance with a feature of the invention, the liquid pressure in the pipes in the region of the discharge orifices is adjustable and ranges between 100 and 150 mm water column within each pipe in the region of the discharge orifices. Advantageously, the treating liquid is a washing liquid, generally water.

Because the various portions of the filter cake on the disk rotate at different peripheral speeds, depending upon their distance from the axis of rotation for a given angular velocity of a disk, it has been found to be advantageous to vary the spacing of the orifices along the individual pipes from one pipe to the next and to provide the orifices of different diameters. This dimensioning of the orifice diameter and spacing can ensure a uniform distribution of the liquid in terms of the quantity of liquid per unit surface area of the filter cake over the entire diameter thereof.

According to a feature of the invention, the discharge orifices are bores formed in the pipes, the diameters of the bores having an order of magnitude of several millimeters.

The array of pipes preferably extends over the total free surface area of the filter on each filtering side thereof. The pipes in different regions of the surface of the filter cake can be supplied with different treating liquids as required and, for example, some of the pipes over a portion of the surface can be supplied with a suspension to be filtered while the remaining pipes can be provided with a washing liquid.

The pipes in different regions of the surface of the filter cake can also be supplied with different washing liquids which can serve, for example, to effect a pre-washing, the main washing, and an after-washing of the filter cake. In connection with the latter feature, it has been found to be desirable to provide a respective pipe for each liquid, the latter pipes being selectively connectable to a pipe extending in the direction of rotation of the disk filter.

Each of the orifices pipes of the present invention can be connected at one end to a liquid-feed arrangement for the treatment liquid while the other end of each orifice pipe is closed. Alternatively, the pipes may be closed at their opposite ends and fed with the treatment liquid substantially centrally of their length. Furthermore, the orifice pipes can be connected in cascade one after another. Furthermore, the pipes can be disposed one above the other directly adjacent the surface of the filter cake. Under these conditions, the spacing of the individual orifice pipes from the surface of the filter cake is constant and can be several centimeters.

Preferably the orifice pipes are disposed in substantially parallel relationship, i.e. are mutually parallel and are horizontal. When the pipes are inclined to the horizontal, however, the angle of inclination is preferably adjustable.

According to a further feature of the invention, the ducts and the liquid feed device can be suspended in a holder so that the entire array can be readily removed from the holder to change the filter cloth which forms the filter surface. The ducts may be circumferentially closed except for the spaced-apart orifices mentioned previously or can be open troughs in which, preferably, their cross-sectional height is greater than their width. The open troughs can be formed by a pipe provided at its top with an opening and upon which a proportionately smaller but higher trough is mounted.

The open channels can be mounted upon a substantially vertically disposed wall adjacent the surface of the filter cake to be treated with the liquid with the lateral flanks of the channel which are turned away from the wall being inclined to the vertical such that the cross section of the channel narrows downwardly and such that the lower edge of the inclined lateral flank lies above the opening of the channel while the upper edge of the inclined lateral flank of each channel forms an overflow from which the liquid can pass in a curtain. The open channels can be formed as individual channel sections disposed at different heights and connected together in a cascade. In this case, each subsequent channel section can be supplied with liquid overflowing from the next higher channel section.

Each array of channel sections connected in cascade is so constructed and arranged that the channel sections lie along respective radii of the disk filter.

The height of the open channels is preferably about 100 to 150 mm and the openings are advantageously disposed directly above the floor of each channel.

In the feed device for the liquid which supplies the orifice pipes, respective overflow boxes can be provided in which the feed pressure for the respective pipe can be controlled by varying the level of overflow, i.e. the height of the overflow edge or weir of the respective box. Each overflow can pass to the next lower overflow box and the overflow boxes can thus be laterally offset from one another.

Each tube orifice pipe can be connected to a common liquid-supply line so that the next lower orifice pipe is supplied by overflow from the next higher supply line. The uppermost orifice pipe can be connected to one side of a weir or overflow edge, to which the feed line is connected, the opposite side of the overflow edge opening into a passage which communicates with the next lower overflow box at the side of its overflow edge which is connected to the respective orifice pipe. Such an orientation of the overflows can be effected vertically along the array so that the overflowing liquid meanders from side to side as it descends to the lowermost overflow box and orifice pipe. It has been found to be advantageous to be able to control the height of the weir for each overflow box and each such weir can be constituted by an elbow of the respective orifice pipe, the upper edge of the inlet side of the elbow having an adjustable level.

The throughput of the feed device can be controlled, in accordance with yet another feature of the invention, so that always a minimum quantity of treating liquid overflows from the weir of the last orifice pipe in the cascade.

The feed device can feed both arrays of pipes juxtaposed with opposite faces of the filter disk, in common, from a location radially outwardly of the filter surface such that the feeding manifold is branched into two legs of a bifurcated manifold arrangement which flanks the plane of the filter disk.

At least one of the orifice pipes with the associated overflow or weir arrangement for establishing the liquid pressure at the outward side of the orifices can form an independent unit which can be suspended in a holder which is removable for replacement of the filter cloth.

The structures described above, in accordance with the present invention, afford numerous advantages. For example, the treatement liquid can be any washing liquid and is always distributed uniformly and gently upon the surface of the filter cake so that the entire surface of the filter cake is washed with the liquid without the danger that the filter cake will be broken loose from the filtering surface.

The washing arrangement is unusually simple and can be of robust construction so that it is especially reliable in operation.

The device of the present invention can be easily installed and, should the occasion arise, be rapidly and simply dismounted when, for example, the filter cloth is to be replaced.

Furthermore, it has been found to be more advantageous that above the suspension level over a predetermined sector of the filter surface, suspension can be deposited upon the filter cake so that the overall filtering efficiency of the filter can be improved. Naturally, one sector can be used exclusively for washing while another sector in the path of the disk can be used for depositing the suspension. For example, the system can be arranged so that above the suspension level over an angle of about 90° (one quadrant), a suspension can be deposited upon the surface of the filter cake while in the next sector or quadrant also over about 90°, the washing can be effected using a second but similar array of orifice pipes or channels.

Moreover, other suspensions or treatment liquids can be applied to the surface of the filter cake above the suspension level so that, for example, a pretreatment can be carried out to prepare the filter cake for washing, this treatment being intensified or advanced during the washing process.

The system of the invention permits simple control of the quantity of the treatment liquid applied to the filter cake since in individual surface regions of the filter the treatment liquid cascades with uniform downward distribution on the filter cake. Since the filter cake (in dependence upon the nature of the filter surface, nature of material constituting the filter cake and the treatment or washing liquid) takes up the liquid to different extents, it is especially important to dimension the supplied liquid over the individual areas contacted thereby so that the liquid is distributed as uniformly as possible. This can be achieved with the present invention most effectively.

Another advantage of the present system is the flexibility of the washing unit especially in that it permits the feeding or manifold system and the pressure control system which communicate with the orifice pipes to be located at relatively large distances from the filter. The orifice pipe arrays or the individual pipes can be replaced or removed entirely as required for the particular filter material or process.

The filter system of the present invention opens the door to many new applications of disk filters and makes them usable in many cases where even intense washing is required, in spite of the fact that there has been an aversion to use of disk filters in these intensive-washing applications.

BRIEF DESCRIPTION OF THE DRAWINGS

The above and other objects, features and advantages of the present invention will become more readily apparent from the following description, references being made to the accompanying drawing in which:

FIG. 4 is a perspective view of a portion of an orifice pipe of FIG. 1 showing another feature of the invention;

FIG. 5 is a detailed elevational view of a portion of FIG. 1 showing the vertical adjustability feature of the invention;

FIG. 6 is a sectional view taken along line VI—VI of FIG. 5;

FIG. 7 is a top elevational view of another embodiment of the invention;

FIG. 8 is an elevational view similar to FIG. 1 showing another embodiment of the invention;

FIG. 10 is a view similar to FIG. 8 showing a further feature of that embodiment;

FIG. 11 is a view similar to FIG. 1 showing a further embodiment of the invention;

FIG. 12 is a view similar to FIG. 1 showing still another embodiment of the invention;

FIG. 13 is a perspective view showing another feature of the invention;

FIG. 14 is a sectional view taken along line XIV—XIV of FIG. 13;

FIG. 15 is a sectional view similar to FIG. 14 showing another feature of that embodiment;

FIG. 16 is a sectional view similar to FIGS. 14 and 15 showing still another feature of that embodiment;

FIG. 17 is a top view of FIG. 16;

FIG. 18 is a sectional view similar to FIGS. 14 and 15 showing still another feature of that embodiment of the invention; and FIG. 19 is a somewhat diagrammatic elevational showing a still further embodiment of the invention.

SPECIFIC DESCRIPTION

Figure 1:
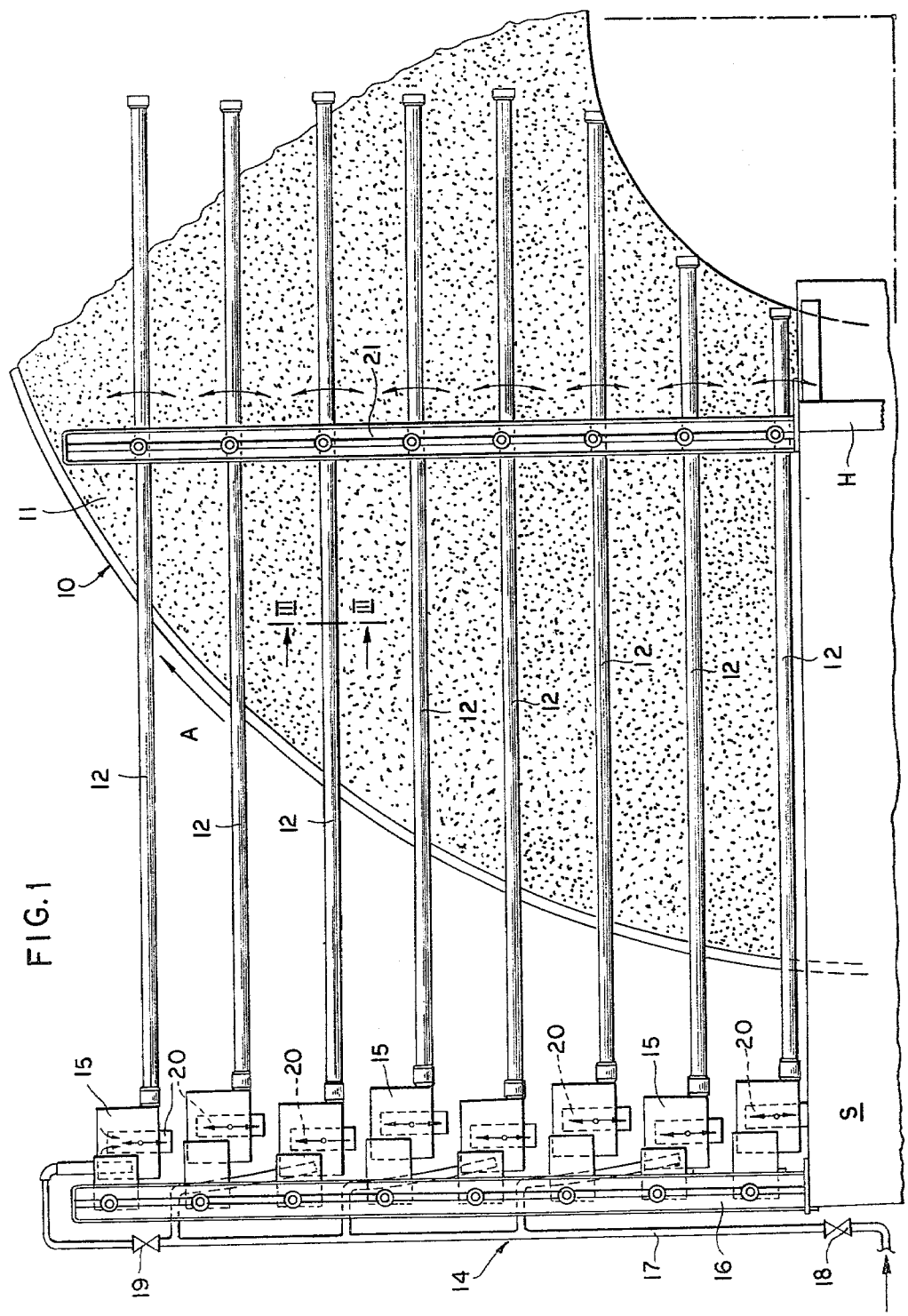
FIG. 1 is a schematic side-elevational view of the device according to the present invention.

In FIG. 1 there has been illustrated a disk filter 10 in schematic or diagrammatic form and in partial side elevational view. Only a portion of the filter disk 10 has been illustrated in FIG. 1 and only the part thereof which concerns the present improvement.

The overall mechanical construction of the filter disk 10, the drive therefor and the means for applying the suspension to the filter cloth surface of the disk have not been illustrated and can be of the type conventional in the art of disk filters. For the purposes of the present invention, only the portion of the filter disk above the suspension level is of significance. It will be apparent that from the position of the filter disk illustrated in FIG. 1, the filter disk rotates into the suspension bath and hence below the suspension level.

To the left of the filter disk illustrated in FIG. 1, there is provided a vertical post 16 upon which a riser 17 is mounted. The riser 17 is provided with a schematically illustrated control valve 18 which regulates the throughput through the riser 17, i.e. the upward flow of the treating liquid.

The riser 17 is provided with an auxiliary valve 19 which can regulate the flow of the treating liquid for selected orifice pipes as represented at 12 and even permit cutting off the flow of the treating liquid to certain orifice pipes.

The riser 17 is provided with lateral outlets which can open into overflow boxes 15 in which the liquid level is adjustable by raising and lowering overflow edges or weirs, here shown as overflow tubes 20.

Preferably each overflow tube 20 has its upper edge disposed at a level such that the excess liquid beyond that required for the respective orifice pipe 12 is permitted to flow downwardly to the next lower overflow box 15. The heights of the tubes 20 can be adjusted for each overflow box so that the liquid supply to each orifice pipe 12 is varied in accordance with the surface area of the filter cake to be covered by the respective discharge and hence the entire surface of the filter cake is uniformly covered with the liquid.

The height of each liquid level in the respective overflow box 15 determines the pressure of the liquid in the respective orifice pipe 12 ahead of the discharge orifices 13 of these pipes.

Figure 3:
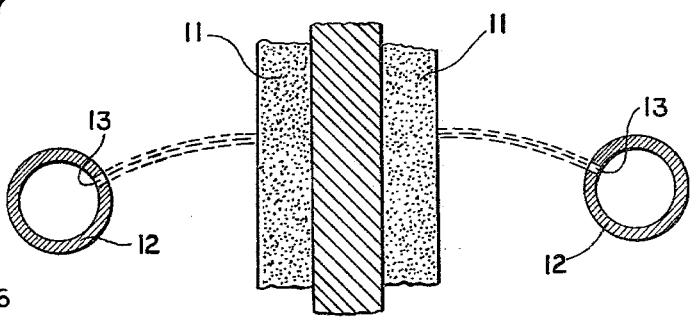
FIG. 3 is a section taken along the line III—III of FIG. 1 but drawn to a larger scale.

Each of the orifice pipes 12 is provided with a predetermined number of discharge orifices 13 which, as can be seen in FIG. 3, may be simple, equally spaced radial bores of uniform diameter, formed in the orifice pipes 12, or as shown in FIG. 4, may be unequally spaced and of different diameters.

From the orifices 13, the liquid cascades onto the filter cake 11 carried by the filter surface. The construction of the filter surface has not been shown in detail and will generally be defined by respective filter cloths, the region between the filter cloth being evacuated to draw the solids from the suspension onto the filter cloths to form the cakes 11 on the opposite vertical flanks of the filter disk.

In principle, only a single connection from the riser 17 is required to deliver liquid to the uppermost overflow box 15, all of the successively lower overflow boxes being filled exclusively by liquid cascading from the next higher box through the respective overflow tube 20.

It has been found to be advantageous, however, to provide the overflow boxes in pairs with the uppermost overflow box of each pair being supplied with liquid from the riser and the lower overflow box of each pair being filled exclusively by overflow from an overflow box thereabove.

The overflow tube of each overflow box opens into the next lower overflow box in the compartment surrounding the overflow tube thereof, to which compartment the respective orifice pipe 12 is connected and which may also be supplied from the riser 17 in the manner described previously.

When respective lateral tubes from the riser 17 are not provided for successive overflow boxes, apart from the uppermost overflow box, the flow of liquid into the uppermost overflow box would be such that a minimum quantity of liquid overflows through the overflow tube 20 of the lowermost overflow box.

For most effective regulation of the feed pressure of the liquid to the orifices of the individual pipes 12, it is advantageous in certain applications, to feed these pipes individually from respective branch ducts of the riser 17. The pipes 12 have their ends turned away from the liquid-feed arrangement 14, closed with respective caps. Centrally along their lengths or at least at a location intermediate their ends, the pipes 12 are retained by a holder 21 which can lie parallel to the riser 17 along a chord of the filter disk. Preferably, the pipes 12 lie upon respective brackets or other fastening devices so that the individual tubes can be readily removed and replaced. The position of the pipes 12 can be adjusted along the upright holder 21, e.g. by providing a vertical slot 21' in this holder and suspending the pipes 12 upon hooks 40 which are attached by a bolt arrangement 40' in the respective slot, as shown in FIGS. 5 and 6.

Each pipe 12 is fixed to the respective overflow box 15 so as to form a unit therewith, these units 12, 15 being suspended upon the vertical post 16 as previously described for the suspension at holder 21. This permits the pipes 12 to be readily removed from the array and rapidly replaced for change of the filter cloth.

Figure 2:
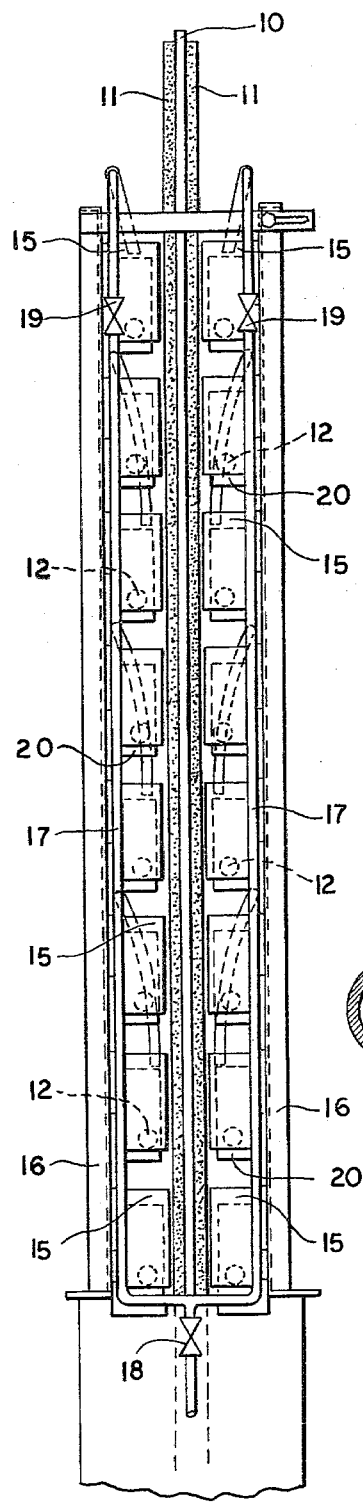
FIG. 2 is an end view of the device of FIG. 1.

As can be seen from FIG. 3, the system of FIGS. 1 and 2 operates such that, from each of the openings or orifices 13 of the pipe 12, a streamlet of a treating liquid such as a wash liquid is projected lightly upon the surface of the filter cake 11 juxtaposed with the array of pipes. The filter disk 10 is rotated in the direction of the arrow A, i.e. clockwise in FIG. 1, while the liquid is distributed over the surface of the filter cake from both sides of the filter disk as described. The spacing and distribution of the pipes 12 and the spacing and dimensions of the orifices 13 are selected in accordance with the nature of the material filtered and the speed of the filter disk 10 so that as homogeneously as possible the treatment liquid covers the filter cakes.

As can be seen from FIG. 2, along both of the opposite faces of the disk filter 10, there are provided planer arrays of parallel horizontal pipes 12 each with respective assemblies of overflow boxes 15. To save space and simplify the construction each two pipes 12 flanking the disk and at the same level can be provided with a common overflow box 15' so that the pipes 12 of each such overflow box extends as shanks of a fork along opposite flanks of the filter disk 10, as illustrated in FIG. 7.

The individual overflow boxes 15 can be laterally offset from one another, staggered from side to side or stacked to minimize the height of the assembly.

As can be seen from FIG. 3, each streamlet of the treating liquid is directed at an angle of about 25° upwardly with respect to the horizontal from the orifice 13 of the respective pipe 12 so that the streamlet contacts the surface of the filter cake 11 substantially perpendicularly thereto. This has been found to be particularly desirable for a uniform distribution of the liquid onto the filter cake.

The spacing of the pipes 12 from the surface of the filter cake is so chosen that even with fluctuations in the thickness of the filter cake there is no danger that the surface of the filter cake will come into contact with a pipe 12. However, it has been found to be advantageous to maintain the distance between the pipes 12 and the surface of the filter cake 11 as small as possible, consistent with the absence of contact, because a reduced distance permits the discharge pressure of the liquid to be reduced and thereby prevents high pressure contact of the liquid with the filter cake, disrupting the latter.

According to a further feature of the invention, the feed lines delivering liquid to the respective overflow boxes 15 are composed of flexible material, e.g. are flexible hoses to permit vertical adjustment of the positions of the overflow boxes along a slot 16' in the post 16 as has been described for the adjustment along the holder 21. Such flexible hoses also simplify the mounting and dismounting procedures for the orifice pipes and the respective overflow boxes.

The entire holder 21 can also be vertically adjustable upon a support S which can also constitute the tank in which the suspension level is maintained. The means for this purpose has been represented diagrammatically at H in FIG. 1. Since the holder 21 can thus be shifted relative to the post 16, the pipes 12 can be given a rising or falling tilt from their left-hand to their right-hand ends (FIG. 1). A tilting arrangement of this type permits the pressure distribution along the pipe 12 to be further controlled and also allows for emptying of the array of pipes.

The portion of the surface of the filter juxtaposed with the array of pipes can also be varied by rendering the array displaceable parallel to the direction in which the pipes extend, by providing more pipes in the array and thereby reducing the interpipe spacing, or by having at least some of the pipes reach to a greater or lesser extent across the array.

In another embodiment of the invention, as shown in FIG. 8, a number of risers 17 are provided for supplying different liquids to different ducts of the array. Each overflow box 15 is fed by a particular riser 17 through the lateral outlet 17' for that individual box. In addition, each individual overflow box 15 is provided with an overflow tube 20', which is formed into an elbow to clear the box below, so as to avoid the introduction of any one particular liquid into a dissimilar liquid contained in another overflow box 15.

Figure 9:
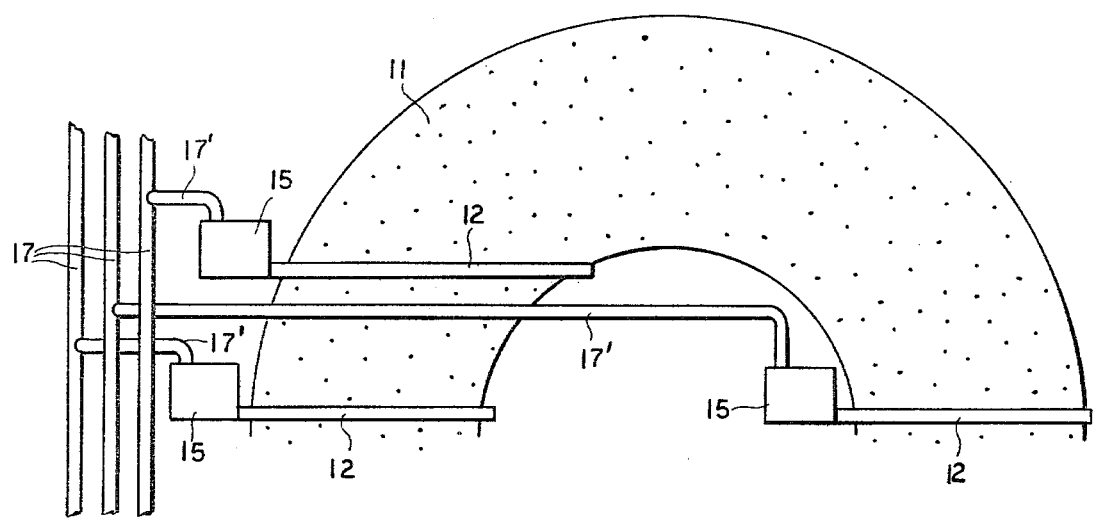
FIG. 9 is an elevational view similar to FIG. 8 showing another feature of that embodiment.

In a further feature of this particular embodiment, as illustrated in FIG. 9, the units 12, 15 can be arranged at different regions of the filter cake 11, supplying different liquids thereto for prewashing, main washing and afterwashing of the filter cake.

A still further feature of the embodiment of FIG. 9 is shown in FIG. 10, in which the risers 17 are provided with plug-in connections 17" at different locations, so that any lateral outlet 17' feeding any unit 12, 15 arranged along the filter cake can be supplied with any liquid.

FIG. 11 illustrates an embodiment of the invention in which the overflow box 15 is arranged intermediate of the ends of the orifices pipe 12, so that, in effect, the pipe 12 extends from either side of the box 15.

In the embodiments shown in FIGS. 13, 14 and 15, the orifice pipe 12 is replaced by an upwardly open channel 12' having a cross section which is higher than it is wide, the height being on the order of 100 to 150 mm, with the opening being provided directly above the floor of the channel. The channels 12' of FIGS. 13 and 14 have a U-shaped cross section with a rounded bottom, while the channel illustrated in FIG. 15 is formed with a flattened door. Each of the channels 12' illustrated are provided with a plurality of openings 13 directed toward the filter cake.

In the embodiment of FIG. 12, the channels 12' are replaced by trough sections 12", which are, in effect, shortened channels. A plurality of such troughs 12" are arranged along radii of the filter cake, disposed at different levels and formed in cascade, so that each successive trough section 12" is supplied with overflow liquid from a preceding trough section.

Another variation on the upwardly open channel feature is the embodiment illustrated in FIGS. 16 and 17 in which a vertically disposed wall 26 lies adjacent the filter cake 11 and is provided with a plurality of channels 12''' arranged thereon with downwardly extending inclined flanks 26a which join the wall 26 to form a V shaped cross section, with each flank 26a lying above the opening of the next lower channel, so that liquid can pass through the overflow 20'', formed in the upper portion of each inclined flank 26a, to the channel below. The wall 26 forms one side of the channels 12''' and is provided with outlets 13 directed toward the filter cake for applying the liquid thereto.

FIG. 18 shows an embodiment of the invention in which the channel is in the form of tubes 12a and 12a' lying adjacent the filter cake 11, the tubes 12a, 12a' being provided with upward openings 18 communicating with respective troughs 12b and 12b' mounted thereon, and which are narrower and higher than the tubes. The tube 12a is provided with an outlet 13 in its wall for directing the liquid toward the filter cake, while the trough 12b' is provided with an outlet 13 also for directing the liquid against the filter cake.

In the final embodiment of the invention, FIG. 19 shows an array in which the orifice tubes 12 are provided at both ends with overflow boxes 15 and 15". The overflow box 15" is connected at its bottom with the tube 12 and feeds liquid directly thereto, while at the other end of tube 12, the box 15, which is also connected thereto at the bottom, receives the liquid which overflows through the overflow tube 20 to the next box 15" directly below, where the liquid is fed into the next lower tube 12 and the process continues, so that the liquid passes downwardly through the array in a meandering pattern.

We claim:
1. A disk-filter apparatus comprising:
   a least one filter disk rotatable about a substantially horizontal axis and lying in a substantially vertical plane and adapted to collect a filter cake along at least one flank of said disk;
   a planar array of generally horizontal ducts parallel to said flank and spacedly juxtaposed with the surface of said filter cake on said disk, said ducts being spaced one below another and having a mutual spacing and being each formed with a multiplicity of openings for directing liquid onto said filter cake substantially homogeneously;
   respective upwardly open receptacles each communicating with a respective one of said ducts;
   overflow means in each receptacle for maintaining a predetermined head of liquid therein and delivering excess liquid to a next lower receptacle; and
   liquid feed means connected to the receptacle of an uppermost one of said ducts for feeding a treating liquid thereto.
2. The apparatus defined in claim 1, further comprising means for adjusting the liquid pressure in said ducts in the region of said openings.
3. The apparatus defined in claim 2 wherein the pressure of said liquid in the region of said openings is between 100 and 150 mm water column.
4. The apparatus defined in claim 1 wherein said liquid is a washing liquid.
5. The apparatus defined in claim 1 wherein said openings are spaced at different distances along the different ducts and have different sizes to ensure homogeneous distribution of liquid into said filter cake.
6. The apparatus defined in claim 1 wherein said openings are bores formed in said ducts.
7. The apparatus defined in claim 6 wherein said bores have diameters of the order of several millimeters.
8. The apparatus defined in claim 1, further comprising another array of such ducts disposed along the opposite flank of said disk, said disk being adapted to receive a further filter cake along said opposite flank.
9. The apparatus defined in claim 1 further comprising means connected to said liquid feed means supply different liquids to different ducts of said array.
10. The apparatus defined in claim 9, further comprising means for supplying separate liquids to different ones of said ducts in different regions of the surface of said filter cake for prewashing, main washing and afterwashing of said filter cake.
11. The apparatus defined in claim 10 wherein said feed means includes a respective pipe connectible to at least one of said ducts at a plurality of locations spaced in the direction of rotation of said filter disk.
12. The apparatus defined in claim 1 wherein each of said ducts is a pipe provided with said openings, each receptacle communicating with the respective of said pipe at one end thereof, the other end of each pipe being closed.
13. The apparatus defined in claim 1 wherein each of said ducts is a pipe provided with spaced apart perforations, said liquid feed means communicating with the pipes of said array intermediate the end of each pipe, the ends of each pipe being closed.
14. The apparatus defined in claim 1 wherein said ducts of said array lie substantially adjacent the surface of said filter cake.
15. The apparatus defined in claim 14 wherein all of said ducts are spaced from the surface of said filter cake by the same distance of substantially several centimeters.
16. The apparatus defined in claim 1 wherein said ducts are substantially parallel to one another.
17. The apparatus defined in claim 1, further comprising means for mounting said ducts to enable adjustment of the tilt thereof to the horizontal.
18. The apparatus defined in claim 1 wherein each of said ducts is a respective pipe formed with a respective receptacle to constitute a unit, and means for suspending each of said units replaceably in said array.
19. The apparatus defined in claim 1 wherein each of said ducts is a peripherally closed tube between said openings.
20. The apparatus defined in claim 1 wherein each of said ducts is an upwardly open channel formed with perforations constituting said openings.
21. The apparatus defined in claim 20 wherein each of said channels has a cross section which is higher than its width.
22. The apparatus defined in claim 20 wherein each of said channels is formed of a tube having an upward opening and upon which a narrower but higher trough is mounted.
23. The apparatus defined in claim 20 wherein a plurality of said channels are arranged adjacent the surface of said filter cakes on a substantially vertically disposed wall, said channels having lateral flanks turned away from said wall which are inclined to the vertical, the cross section of each channel converging downwardly and the lower edge of each inclined latter flank lying above the opening of the next lower channel while the upper edge of the inclined lateral flank of each channel is formed as an overflow.

24. The apparatus defined in claim 20 wherein said channels are each formed from a plurality of trough sections disposed at different levels and connected in cascade.

25. The apparatus defined in claim 24 wherein each successive channel section is supplied with liquid by overflow from a preceding channel section.

26. The apparatus defined in claim 24 wherein each group of channel sections in cascade consists of channel sections lying substantially along radii of said filter.

27. The apparatus defined in claim 20 wherein said channels have a height of 100 to 150 mm and are provided with said openings directly above the floor of said channels.

28. The appartus defined in claim 1 wherein said ducts are each formed as perforated tubes extending from a location beyond the outline of said disk of at least a quadrant thereof, each of said tubes being closed at an end overlying said disk and communicating with said feed means at said other end, said feed means including a vertically extending post, a riser extending along said post and supplying liquid to said pipes, and respective overflow boxes mounted vertically adjustably on said post aand each connected with a respective one of said pipes, each of said overflow boxes being provided with a vertically adjustable overflow tube forming an overflow edge in the respective pipe, the overflow tube of each higher overflow box opening into the overflow box of the next lower pipe, said riser being provided with valve means for feeding said liquid at least into the uppermost overflow box, said apparatus also comprising a holder engaging said pipes intermediate the end thereof and shiftable to tilt said pipes relative to the horizontal, a respective such array of pipes flanking each side of said disk, said arrays both being supplied with liquid in common form said feed means.

29. The apparatus defined in claim 1 wherein each of said ducts is provided with an overflow box having an adjustable overflow edge defining the liquid pressure in the respective duct.

30. The apparatus defined in claim 29 wherein each of said overflow boxes is provided with means for delivering the liquid overflowing the respective edge to the next lower overflow box.

31. The apparatus defined in claim 29 wherein said feed means include a liquid supply pipe, said ducts being paired so that each liquid supply pipe feeds liquid to the upper duct of each of said pairs.

32. The apparatus defined in claim 29 wherein the uppermost duct on one side is connected to the overflow of a liquid feed device while its opposite side is provided with an overflow device which opens into the overflow box of the next lower pipe so that liquid passes downwardly between said overflow box in a meander pattern.

33. The apparatus defined in claim 32 wherein each overflow of a respective duct is formed as a pipe elbow of adjustable height.

34. The apparatus defined in claim 32, further comprising means for controlling the flow of liquid through said feed means so that only a minimum quantity of liquid overflows from the lowermost overflow box.

35. The apparatus defined in claim 1 wherein a respective array of such ducts is disposed along each side of said filter, said array being connected to a common feed device radially outwardly of the filter, said array flanking said filter as legs of a fork.

36. The apparatus defined in claim 1 wherein each of said ducts is fixed to a respective overflow box for controlling the liquid pressure in the respective duct, each duct and the respective overflow box forming units, said apparatus further comprising means for removably sustaining said units in said array for changing a filter cloth on the surface of said disk.

* * * * *